United States Patent
Chrabieh et al.

(10) Patent No.: US 8,711,958 B2
(45) Date of Patent: Apr. 29, 2014

(54) METHOD FOR DECODING A SPATIALLY MULTIPLEXED DATA SIGNAL USING A MAXIMUM LIKELIHOOD DETECTION

(75) Inventors: Rabih Chrabieh, Paris (FR); Yang Liu, Paris (FR)

(73) Assignee: Sequans Communications, Puteaux (FR)

( * ) Notice: Subject to any disclaimer, the term of this patent is extended or adjusted under 35 U.S.C. 154(b) by 45 days.

(21) Appl. No.: 13/598,161

(22) Filed: Aug. 29, 2012

(65) Prior Publication Data
US 2014/0062733 A1    Mar. 6, 2014

(51) Int. Cl.
*H04L 5/12*    (2006.01)

(52) U.S. Cl.
USPC .......................................................... 375/262

(58) Field of Classification Search
USPC .................................................. 375/262–267
See application file for complete search history.

(56) References Cited

U.S. PATENT DOCUMENTS

| 7,835,458 | B2 | 11/2010 | Muquet et al. | |
|---|---|---|---|---|
| 2007/0268813 | A1 | 11/2007 | Muquet et al. | |
| 2009/0190683 | A1* | 7/2009 | Awater et al. | 375/262 |

* cited by examiner

*Primary Examiner* — Jaison Joseph
(74) *Attorney, Agent, or Firm* — David D. Brush; Westman, Champlin & Koehler, P.A.

(57) ABSTRACT

The disclosure relates to a method for decoding a received signal in a MIMO communication system and in at least one layer, each layer carrying at least one data symbol belonging to a signal constellation. The method includes, for one of the at least one layer, a maximum likelihood detection step. This step includes:

selecting one candidate value for the data symbol of the layer, and determining the Euclidian distance between the received signal Y and the data signal transmitted using said candidate value multiplied by said channel matrix H, weighted by the inverse of a noise covariance matrix C such as $\|Y-\Sigma_i H_i x_i\|_{C^{-1}}^2$, expressed as:

$$\Sigma_{i\neq n}\|H_i\|_{C^{-1}}^2|x_i|^2 - 2\Re(H_i^H C^{-1} Y - 0.5\Sigma_{j\neq i,n} H_j^H C^{-1} H_j x_j) x^*_i + \|H_n\|_{C^{-1}}^2 |x_n|^2 - 2\Re(H_n^H C^{-1} Y - \Sigma_{j\neq n} H_n^H C^{-1} H_j x_j) x^*_n = \Sigma_{i\neq n} \alpha_i^R (\Re x_i) - 2\beta_i^R \Re x_i + \alpha_n^R (\Im x_n)^2 - 2\beta_n^R \Re x_n + \Sigma_{i\neq n} \alpha_i^I (\Im x_i)^2 - 2\beta_i^I \Im x_i + \alpha_n^I (\Im x_n)^2 - 2\beta_n^I \Im x_n.$$

The terms depending on $\alpha_k$ are computed by adding to each of them a predetermined constant depending on the size of the constellation of the layer k, called a constellation dependent constant.

17 Claims, 3 Drawing Sheets

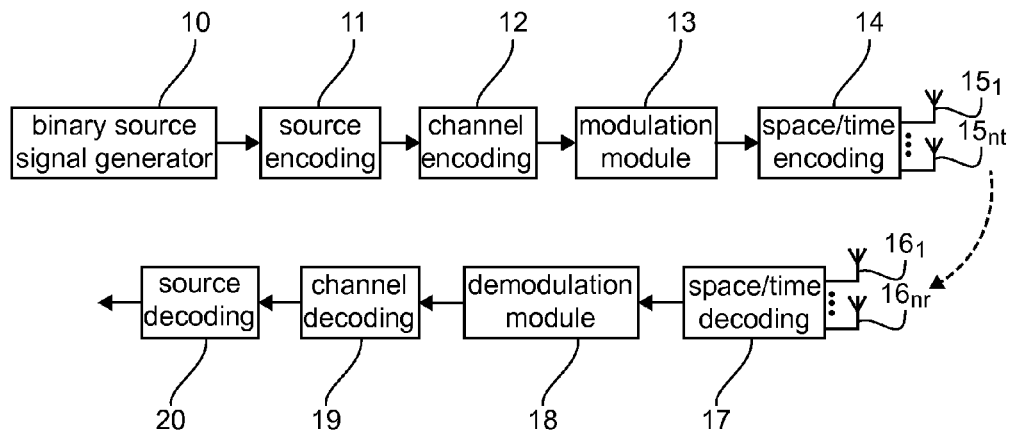
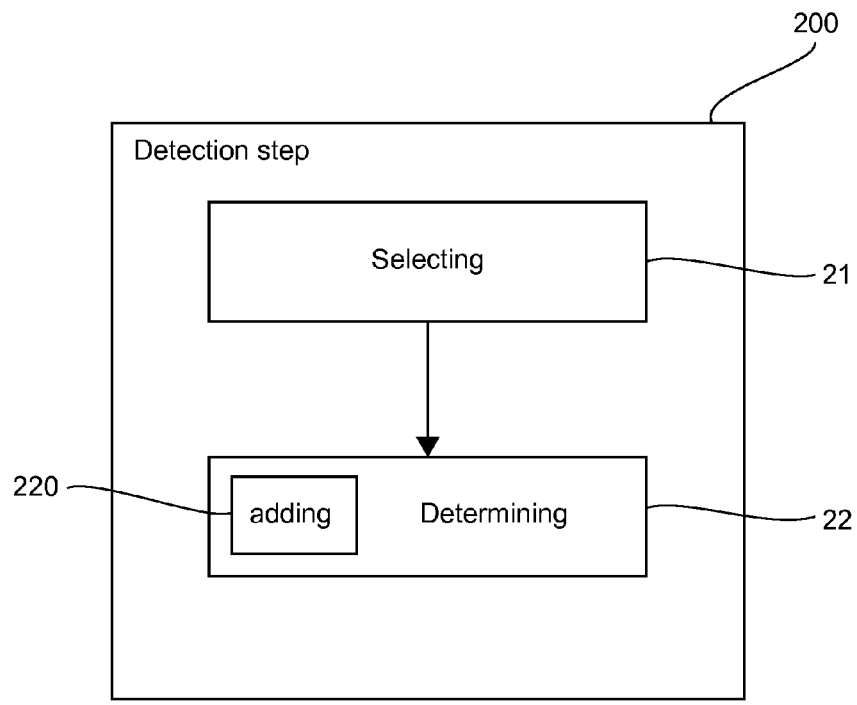

METHOD FOR DECODING A SPATIALLY MULTIPLEXED DATA SIGNAL USING A MAXIMUM LIKELIHOOD DETECTION

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of wireless digital communications.

More specifically, the disclosure relates to the transmission and reception, and especially in a MIMO ("Multiple Input Multiple Output") type or MISO ("Multiple Input Single Output") type multiple-antenna system, through the transmission of signals subjected to an encoding using a spatial multiplexing.

BACKGROUND OF THE DISCLOSURE

The techniques of transmission in systems comprising multiple antennas have many advantages.

In particular, these techniques make it possible to attain an increased transmission capacity by augmenting the spectral efficiency in the transmission channel through the use of space/time codes. These space/time codes can be used especially to distribute the modulated symbols on the different degrees of freedom of the channel.

FIG. 1 provides a more precise illustration of a transmission scheme in a multi-antenna system.

On the sending side, a binary source signal 10 to be sent undergoes a source encoding 11 and then a channel encoding 12. It then goes through a modulation module 13 designed to convert binary elements into complex symbols: such a module thus associates a complex signal, belonging to a constellation (of the QAM type for example), with a group of bits. Then, a space/time encoding 14 of each group of K symbols is performed and these symbols are then sent on $n_t$ sending antennas $15_1$ to $15n_t$ in a MIMO type transmission context.

The signal is then conveyed through a transmission channel and then received on the $n_r$ receiving antennas $16_1$ to $16n_r$. Each receiving antenna receives a linear combination of the symbols sent on each of the $n_t$ sending antennas. This linear combination corresponds to a segmentation of the sent signal in multiple layers (in other words: streams, or beams).

The received signal can be thus represented by a linear transformation plus an additive noise vector B. Each layer carries one symbol $x_i$ that is selected from the constellation used during the modulation.

Considering that a received layer i is a channel vector $H_i$ times the symbol $x_i$. The received vector Y, comprising N layers is:
$Y = H_0 x_0 + H_1 x_1 + \ldots + B$, where Y, B and the $H_i$ for $i \in [0, N-1]$ are vectors of size $n_r \times 1$ where $n_r$ is the number of receiving antennas. The covariance matrix of the noise B is denoted by matrix C.

At the receiver, the channel vector $H_i$ is known (via special pilots and channel estimation) but the symbol $x_i$ is unknown.

Thus, the received signal Y is first of all decoded in a space/time decoding module 17 applying a processing operation corresponding to a reverse of the space/time encoding applied when sending.

The layer separation is then achieved by an equalizer or detector (not represented) of the decoding block 17. Given the received vector Y the equalizer aims at finding the symbol $x_i$ of each layer i, from the transmitter's constellation of symbols, that minimizes the distance between the two vectors $\|Y-Hx\|^2$ i.e. the hypothetical transmitted candidate (without noise) that is the nearest to the received vector. When the noise is taken into account, the minimum distance is weighted by the inverse noise covariance matrix $C^{-1}$.

The equalized signal at output of the space/time decoding block 17 is then fed into a demodulation module 18 and undergoes operations of channel decoding 19 and source decoding 20, delivering an estimated binary signal.

Unfortunately, owing to the use of several antennas, the decoding of the received signals is particularly complex.

Indeed, the multiple layers are usually orthogonal at the transmitter side where they are linearly combined. But at the receiver side, if the channel conditions are non-ideal, they can arrive as non-orthogonal vectors (after transformation by the channel matrix applied to each vector). Interference between the layers arises in this case.

Using known methods for equalizing, the receiver tries to separate the layers in order to simplify the subsequent processing of each layer or subgroup of layers.

However, the complexity of these known methods for equalizing greatly increases depending on the number of antennas and the number of modulation states.

Some solutions have been proposed to reduce especially the cost of complexity of the equalizer. Among these solutions the Zero-Forcing (ZF) or the Minimum Mean Squared Error (MMSE) equalizers have been proposed.

The Zero-Forcing equalizer decodes a layer of interest while ignoring all other interfering layers (as if a unique layer were transmitted), an "interfering layer" being a layer which contains lots of interference. The Minimum Mean Squared Error equalizer decodes a layer of interest while assuming that all other interfering layers have Gaussian distribution and behave like noise.

These two techniques, respectively ignoring all other interfering layers or assuming that all other interfering layers have Gaussian distribution, do not correspond to the reality and are thus less efficient in terms of performance.

Thus, in order to obtain high decoding performance, it is necessary to use an optimal decoding technique, in terms of maximum likelihood decoding in the decoding module 17.

Indeed Maximum Likelihood Detector (MLD) method for equalizing takes into account the true distribution of each interfering layer, i.e. its constellation. Thus, using such a method leads to an increase in decoding performance but at the cost of an increase of complexity since all the possible values of the constellation of each layer are tested. As a consequence, when using a maximum likelihood detector, the overall number of possible values to test grows exponentially with the number of layers.

Indeed, state of the art solutions implementing a Maximum Likelihood Detector (MLD) method for equalizing correspond for example to the known sphere decoding, Lenstra-Lenstra-Lovász (LLL) reduction, or a decomposition transforming the channel matrix into a triangular matrix with plenty of zeros called the QR decomposition, methods.

However, such state of the art solutions implementing a Maximum Likelihood Detector (MLD) method for equalizing presents some known drawbacks.

A first drawback of such methods is the complexity that is involved when considering a small number of layers. Indeed, all the symbols of each constellation of each layer have to be processed for finding the best candidate symbol. In addition, such methods are not really suitable for a hardware implementation.

In addition, such methods does not propose efficient solutions for dealing with interference mitigation (where noise is colored, e.g. unknown interfering layers, and for example represented by a colored noise covariance matrix is $C=EBB^H$ ($n_r \times n_r$) with E the expectation operator, i.e. averaging over all possible realizations. Indeed, in such methods a noise pre-whitening is performed, which involves an additional step and as a consequence an increase of the complexity of the process.

SUMMARY

An aspect of the disclosure relates to a method for decoding a received signal Y corresponding to a data signal transmitted in a MIMO communication system through a channel represented by a channel matrix H, said data signal comprising a set of data symbols x transmitted in at least one layer, each layer carrying at least one data symbol belonging to a signal constellation.

According to an aspect of the disclosure, the method comprises, for one of said at least one layer, called a current layer n, a detection step that determines the maximum likelihood for at least one data symbol of said data signal.

In addition, according to an exemplary aspect of the disclosure, said detection step comprises:
- selecting one candidate value for the data symbol of the current layer n,
- determining the Euclidian distance between the received signal Y and the data signal transmitted using candidate value multiplied by said channel matrix H, weighted by the inverse of a noise covariance matrix C such as $\|Y - \Sigma_i H_i x_i\|_{C^{-1}}^2$ expressed as:

$$\sum_{i \neq n} \|H_i\|_{C^{-1}}^2 |x_i|^2 - 2\Re\left(H_i^H C^{-1} Y - 0.5 \sum_{j \neq i,n} H_i^H C^{-1} H_j x_j\right) x_i^* +$$

$$\|H_n\|_{C^{-1}}^2 |x_n|^2 - 2\Re\left(H_n^H C^{-1} Y - \sum_{j \neq n} H_n^H C^{-1} H_j x_j\right) x_n^* = \sum_{i \neq n} \alpha_i^R (\Re x_i)^2 -$$

$$2\beta_i^R \Re x_i + \alpha_n^R (\Re x_n)^2 - 2\beta_n^R \Re x_n + \sum_{i \neq n} \alpha_i^I (\Im x_i)^2 -$$

$$2\beta_i^I \Im x_i + \alpha_n^I (\Im x_n)^2 - 2\beta_n^I \Im x_n$$

where:
$H_k$ is a vector representing the channel associated to a layer k, with $k \in \{i, j, n\}$, $i, j, n \in [0, N-1]$, $i, j, n$ being integers, possibly equal and N being the number of layers of said data signal;
$x_k$ is the constellation symbol of the layer k;

$$\alpha_k^R = \alpha_k^I = a_k = \|H_k\|_{C^{-1}}^2,$$

$$\beta_{i \neq n}^R = \Re H_i^H C^{-1} Y - 0.5 \sum_{i \neq i,n} \Re H_i^H C^{-1} H_j x_j,$$

-continued $$\beta_{i \neq n}^I = \Im H_i^H C^{-1} y - 0.5 \sum_{j \neq i,n} \Im H_i^H C^{-1} H_j x_j,$$

$$\beta_n^R = \Re H_n^H C^{-1} Y - \sum_{j \neq n} \Re H_n^H C^{-1} H_j x_j,$$

$$\beta_n^I = \Im H_n^H C^{-1} Y - \sum_{j \neq n} \Im H_n^H C^{-1} H_j x_j,$$

and where the terms depending on $\alpha_k$ are computed by adding (220) to each of them a predetermined constant depending on the size of the constellation of the layer k, called a constellation dependent constant.

Thus an aspect of the disclosure relies on a novel and inventive approach for decoding a received signal Y corresponding to a data signal transmitted in a MIMO communication system through a channel represented by a channel matrix H using a method for performing a new maximum likelihood detection implementation.

Such a method permits indeed to achieve a very low complexity maximum likelihood detection (MLD) in MIMO communications, with precise Max-Log-MAP LLR output, without norm approximation and without QR decomposition.

The method according to an aspect of the disclosure includes reducing the complexity by processing at least one layer with fewer and simpler operations than the ones required by the techniques of the prior art.

According to an aspect of the disclosure, one first aspect of reducing the complexity is achieved by the step of selecting, in other words slicing, one candidate value for the data symbol $x_n$ of the current layer. Such a step permits to avoid the test of all the possible values of the constellation of a layer n since only one value is tested among all the values of the possible values of the constellation.

According to a second aspect of reducing the complexity, the method uses, in the step of determining, a predetermined constant depending on the size of the constellation of a considered layer, called a constellation dependent constant.

By combining these two aspects, an aspect of the disclosure sets out to counter the prejudices of the person skilled in the art by adding an operation of addition, which succeeds in reducing the whole complexity of the method.

Indeed, such a predetermined constellation dependent constant helps to increase the speed of said method considering that it is implemented thanks to a binary writing as explained in the following. In addition, such a predetermined constellation dependent constant can be viewed as a "virtual term". Adding and subtracting such "virtual terms", based on constellation type, helps as explained in the following to eliminate multiplications or transform them into one, two or few additions, which is simpler in terms of complexity.

Implementing such an addition is not obvious since it requires first to determine a particular expression of the Euclidian distance between the received signal and the data signal transmitted using the candidate value.

In addition, it can be seen that the method according to an aspect of the disclosure is able to take into account noise without using noise pre-whitening, and especially a colored noise, since the expression of the Euclidian distance involve a noise covariance matrix which can be easily adapt as a function of the noise involved in a the considered channel.

Such a way of handling noise presents also the advantage of being simple to implement. In particular, the vector $H_i^H C^{-1}$ involving the channel and noise covariance matrix is typically a slow varying term as a function of frequency and time that does not involve the data path (vector Y). To reduce complexity, this vector $H_i^H C^{-1}$ can be interpolated over frequency and time, rather than computing the term for each subcarrier.

The method for decoding according to an aspect of the disclosure can be applied independently for any considered layer.

According to one particular aspect of the disclosure, said constellation dependent constant is equal to $(1+\max(\Re x)^2)/2$, where $\max(\Re x)$ corresponds to the maximum real part of the candidate values of said constellation of the layer k.

For example, if the constellation of the considered layer is a 64QAM, such a constellation can be represented advantageously by a normalized representation, which comprises $8^2$ points. The coordinates of each point is a couple of two integer values, each belonging for example to $\{-7, -5, -3, -1, +1, +3, +5, +7\}$.

Thus, adding a constellation dependent constant equal to $25=(1+(7)^2)/2$ to terms depending on $\alpha_k$ results in that $\alpha_k((\Re x)^2 - 25) \in \{0, -16\alpha_k, \pm 24\alpha_k\}$ which is really easier to process in terms of binary writing in a program.

According to the expression $(1+\max((\Re x)^2)/2$, it appears clearly that the value of the constellation dependent constant varies with the size of the considered constellation.

Indeed, for QPSK for example, the constellation comprises 2 points each belonging to $-1, +1$ thus the constellation dependent constant is equal to 1.

Considering a similarly normalized constellation representation, the constellation dependent constant is 1 for QPSK, 1 or 5 for 16QAM, 25 for 64QAM, 113 for 256QAM, 481 for 1024QAM, etc.

According to one other particular characteristic of the disclosure, the terms depending on $\beta_k$ are computed by adding the constant $2.M.\beta_k$ to each of them, where M is an integer. In particular, $M=+/-1$ can be considered as the best case.

Such an addition that also goes counter the prejudices of the man skilled in the art; helps to improve again the reduction of complexity of maximum likelihood detection (MLD) in MIMO communications.

According to an aspect of the disclosure, the method comprises, for all constellation symbols $x_i$ and $x_j$ different from the constellation symbol $x_n$ of the current layer n, an exhaustive search using a maximum likelihood technique for setting values of the constellation symbols $x_i$ and $x_j$.

According to this embodiment, it is considered that the data signal comprises symbols transmitted over a plurality of layers. After an exhaustive search, the step of determining according to an aspect of the disclosure delivers the optimized values of the constellations symbols of all the other layers i and j, and called the layers of interest, which are different from the layer n for which a candidate value has been selected before.

In other terms, the current layer n is thus used to optimize the other layers i, j and is not a layer of interest.

Indeed, the minimum Euclidian distance is taken over all possible constellation values $x_i$ and $x_j$. For example, if the layer i is of the type 64 QAM, there are 64 possible constellation values.

According to another embodiment, the method comprises, for constellation symbols $x_i$ of at least one layer i different from the current layer n, a search in a predetermined region of the constellation symbols $x_i$.

Such an embodiment brings the advantage of reducing the complexity since the search space of a given layer i is reduced. Such a reduced subset can be obtained for example by using a minimum mean squared error technique.

According to another particular characteristic, said current layer n is the layer with the highest constellation order.

Thus, considering different sizes of constellation layers, choosing a current layer n with the highest constellation order, in other words the highest size of constellation, permits to increase the reduction of the processing operations.

Indeed in the step of selecting, one candidate value for the data symbol $x_n$ of the current layer is selected and then used in the step of determining. Choosing a current layer n with the highest constellation order, in other words the highest size of constellation permits to avoid the test of all the possible values of the highest constellation of a layer n since only one value is tested among all the values of the possible values of the constellation.

According to one an aspect of the disclosure, said signal comprises a set of data symbols transmitted in one layer, $i=j=n=0$ and $\alpha_k=\alpha_0=\|H_0\|^2_{C^{-1}}$, $\beta_{i\neq n}^R = \Re H_0^H C^{-1} Y$ and, $\beta_{i\neq n}^I = \Im H_0^H C^{-1} Y$.

According to such embodiment, the data signal comprises symbols transmitted over a single layer and determining the Euclidian distance is useful and necessary when considering a subsequent refinement processing.

As already said, such a method permits to reduce the complexity even if the data signal comprises only one later since it involves very few and simple operations.

According to another embodiment, said signal comprises a set of data symbols transmitted in two layers, $i=j$, et, $n\in[0,1]$ $\alpha_k=\|H_k\|^2_{C^{-1}}\beta_{i\neq n}^R = \Re H_i^H C^{-1} Y$, $\beta_n^R = \Re H_n^H C^{-1} Y - \Re H_n^H C^{-1} H_i x_i$, $\beta_{i\neq n}^I = \Im H_i^H C^{-1} Y$ and $\beta_n^I = \Im H_n^H C^{-1} Y - \Im H_n^H C^{-1} H_i x_i$.

According to this embodiment, it is considered that the data signal comprises symbols transmitted over two layers. After an exhaustive search, the step of determining according to an aspect of the disclosure delivers the optimized values of the constellations symbols of the layers i for example i=0, called the layer of interest, which is different from the layer n, for example n=1, for which a candidate value has been selected before.

In other terms, the current layer n=1 is thus used to optimize the other layers i=0, and is not a layer of interest.

Indeed, the minimum Euclidian distance is taken over all possible constellation values $x_0$ According to a particular characteristic of this embodiment, when the terms depending on $\beta_k$ are computed by adding the constant $2.M.\beta_k$ to each of them, where M is an integer and considering that $\Re H_n^H C^{-1} H_i x_i = \Re H_n^H C^{-1} H_i \Re x_i - \Im H_n^H C^{-1} H_i \Im x_i$ and $\Im H_n^H C^{-1} H_i x_i = \Im H_n^H C^{-1} H_i \Re x_i + \Re H_n^H C^{-1} H_i \Im x_i$, $\beta_{i\neq n}^R = \Re H_i^H C^{-1} Y + M . \Re H_n^H C^{-1} H_i + M . \Im H_n^H C^{-1} H_i$ and $\beta_{i\neq n}^I = \Im H_i^H C^{-1} Y - M . \Im H_n^H C^{-1} H_i + M . \Re H_n^H C^{-1} H_i$.

Such aspect results in increasing the reduction of the complexity of the method for a data signal comprising symbols transmitted over two layers, since the new expressions of $\beta_{i\neq n}^R$ and $\beta_{i\neq n}^I$ involves less complex operations (additions) for implementing the method in comparison with the operations involves when considering the computations involved by $\beta_n^R = \Re H_n^H C^{-1} Y - \Re H_n^H C^{-1} H_i x_i$, and $\beta_n^I = \Im H_n^H C^{-1} Y - \Im H_n^H C^{-1} H_i x_i$ Advantageously, said method comprises a subsequent step of decoding, for example a turbo-decoding.

It can be said that all steps of the method of decoding described above correspond to a first decoding step. After this first decoding step, an additional step of decoding can be implemented for refining. For example such a refinement is implemented by using a turbo-decoding.

According to another particular aspect of the disclosure, when the noise is white Gaussian noise, the noise covariance matrix C is equal to $\sigma^2 I$, where I is the identity matrix and $\sigma^2$ is the variance of said white Gaussian noise.

According to another particular aspect of the disclosure, said step of selecting one candidate value for the data symbol of the current layer n implements a hard-symbol slicing.

According to another particular aspect of the disclosure, said method implements a soft-bit decision step.

Such a soft-bit decision helps to improve the accuracy of the step of maximum likelihood detection.

According to an embodiment, wherein when said signal comprises a set of data symbols transmitted in N≥2 layers, the method comprises S≤N iterations, each iteration processing Q<N layers, while the other (N-Q) layers are included in said covariance matrix C, and delivering transmitted symbols of R≤(Q-1) layers of said Q first layers, called resulting layers, one iteration processing Q layers being different from the resulting layers issued by the previous iterations, Q, R, S being integers able to be different from one iteration to the other.

In particular, according to an example of such embodiment where Q=2, each iteration processing two layers while the other (N-2) layers are included in said covariance matrix C, and delivering transmitted symbols of one layer of said two first layers, called a resulting layer, one iteration processing two layers being different from the resulting layers issued by the previous iterations.

Such embodiment permits to obtain the whole N optimized values by processing the layers two layers by two layers in N iterations according to the above example (or in groups of Q layers according to the general principle of this embodiment). Such a process permits to reduce the complexity since as seen above processing a data signal comprising symbols transmitted over two layers involves les complex operations than processing a data signal comprising symbols transmitted over N layers.

In addition, according to this example, at each iteration the other layers, different from the two processed layers of the iteration are taken into account since they are treated as noise.

In another embodiment, the disclosure pertains to a decoder for decoding a received signal Y corresponding to a data signal transmitted in a MIMO communication system through a channel represented by a channel matrix H, said data signal comprising a set of data symbols x transmitted in at least one layer, each layer carrying at least one data symbol belonging to a signal constellation, said decoder comprises, for one of said at least one layer, called a current layer n, means for detecting that determines the maximum likelihood for at least one data symbol of said data signal, wherein said means for detecting comprises:

means for selecting one candidate value for the data symbol of the current layer n, means for determining the Euclidian distance between the received signal Y and the data signal transmitted using said candidate value multiplied by said channel matrix H, weighted by the inverse of a noise covariance matrix C such as $\|Y-\Sigma_i H_i x_i\|_{C^{-1}}^2$, expressed as:

$$\sum_{i\neq n}\|H_i\|_{C^{-1}}^2 |x_i|^2 - 2\Re\left(H_i^H C^{-1} Y - 0.5 \sum_{j\neq i,n} H_i^H C^{-1} H_j x_j\right)x_i^* +$$

$$\|H_n\|_{C^{-1}}^2 |x_n|^2 - 2\Re\left(H_n^H C^{-1} Y - \sum_{j\neq n} H_n^H C^{-1} H_j x_j\right)x_n^* =$$

$$\sum_{i\neq n} \alpha_i^R (\Re x_i)^2 - 2\beta_i^R \Re x_i + \alpha_n^R (\Re x_n)^2 - 2\beta_n^R \Re x_n +$$

$$\sum_{i\neq n} \alpha_i^I (\Im x_i)^2 - 2\beta_i^I \Im x_i + \alpha_n^I (\Im x_n)^2 - 2\beta_n^I \Im x_n$$

wherein:

$H_k$ is a vector representing the channel associated to a layer k, with k∈{i, j, n}, i, j, n ∈[0, N−1], i, j, n being integers, possibly equal and N being the number of layers of said data signal;

$x_k$ is the constellation symbol of the layer k;

$\alpha_k^R = \alpha_k^I = \alpha_k = \|H_k\|_{C^{-1}}^2$, $\beta_{i\neq n}^R = \Re H_i^H C^{-1} Y - 0.5 \Sigma_{j\neq i,n} \Re H_i^H C^{-1} H_j x_j$, $\beta_{i\neq n}^I = \Im H_i^H C^{-1} Y - 0.5 \Sigma_{j\neq i,n} \Im H_i^H C^{-1} H_j x_j$, $\beta_n^R = \Re H_n^H C^{-1} Y - \Sigma_{j\neq n} \Re H_n^H C^{-1} H_j x_j$, $\beta_n^I = \Im H_n^H C^{-1} Y - \Sigma_{j\neq n} \Im H_n^H C^{-1} H_j x_j$, wherein the terms depending on $\alpha_k$ are computed by adding to each of them a predetermined constant depending on the size of the constellation of the layer k, called a constellation dependent constant.

A decoder of this kind is especially adapted to implement the decoding method described here above.

The disclosure pertains also to a computer program product downloadable from a communications network and/or stored on a non-transitory computer readable medium and/or executable by a microprocessor, said computer program product comprising program code instructions for implementing a method for decoding a received signal Y corresponding to a data signal transmitted in a MIMO communication system through a channel represented by a channel matrix H, said data signal comprising a set of data symbols x transmitted in at least one layer, each layer carrying at least one data symbol belonging to a signal constellation, wherein said computer program product comprises program code instructions for processing for one of said at least one layer, called a current layer n, a detection step that determines the maximum likelihood for at least one data symbol of said data signal, wherein said detection step comprises:

selecting one candidate value for the data symbol of the current layer n, determining the Euclidian distance between the received signal Y and said candidate value multiplied by said channel matrix H, weighted by the inverse of a noise covariance matrix C such as $\|Y-\Sigma_i H_i x_i\|_{C^{-1}}^2$, expressed as:

$$\sum_{i\neq n}\|H_i\|_{C^{-1}}^2 |x_i|^2 - 2\Re\left(H_i^H C^{-1} Y - 0.5 \sum_{j\neq i,n} H_i^H C^{-1} H_j x_j\right)x_i^* +$$

$$\|H_n\|_{C^{-1}}^2 |x_n|^2 - 2\Re\left(H_n^H C^{-1} Y - \sum_{j\neq n} H_n^H C^{-1} H_j x_j\right)x_n^* =$$

-continued $$\sum_{i \neq n} \alpha_i^R (\Re x_i)^2 - 2\beta_i^R \Re x_i + \alpha_n^R (\Re x_n)^2 - 2\beta_n^R \Re x_n +$$

$$\sum_{i \neq n} \alpha_i^I (\Im x_i)^2 - 2\beta_i^I \Im x_i + \alpha_n^I (\Im x_n)^2 - 2\beta_n^I \Im x_n$$

wherein:

$H_k$ is a vector representing the channel associated to a layer k, with k∈{i, j, n}, i, j, n ∈[0, N−1], i, j, n being integers, possibly equal and N being the number of layers of said data signal; $x_k$ is the constellation symbol of the layer k;

$\alpha_k^R = \alpha_k^I = \alpha_k = \|H_k\|^2_{C^{-1}}$, $\beta_{i \neq n}^R = \Re H_i^H C^{-1} Y - 0.5 \Sigma_{j \neq i,n} \Re H_i^H C^{-1} H_j x_j$, $\beta_{i \neq n}^I = \Im H_i^H C^{-1} Y - 0.5 \Sigma_{j \neq i,n} \Im H_i^H C^{-1} H_j x_j$, $\beta_n^R = \Re H_n^H C^{-1} Y - \Sigma_{j \neq n} \Re H_n^H C^{-1} H_j x_j$, $\beta_n^I = \Im H_n^H C^{-1} Y - \Sigma_{j \neq n} \Im H_n^H C^{-1} H_j x_j$, wherein the terms depending on $\alpha_k$ are computed by adding to each of them a predetermined constant depending on the size of the constellation of the layer k, called a constellation dependent constant.

BRIEF DESCRIPTION OF THE DRAWINGS

Other features and advantages of embodiments shall appear from the following description of a particular embodiment, given by way of an illustrative and non-exhaustive example and from the appended drawings, of which:

FIG. 1 already commented upon with reference to the prior art presents a transmission scheme of a MIMO system;

FIG. 2 illustrates the main steps of the decoding method according to an aspect of the disclosure;

DETAILED DESCRIPTION OF ILLUSTRATIVE EMBODIMENTS

1. General Principle

Figure 3:
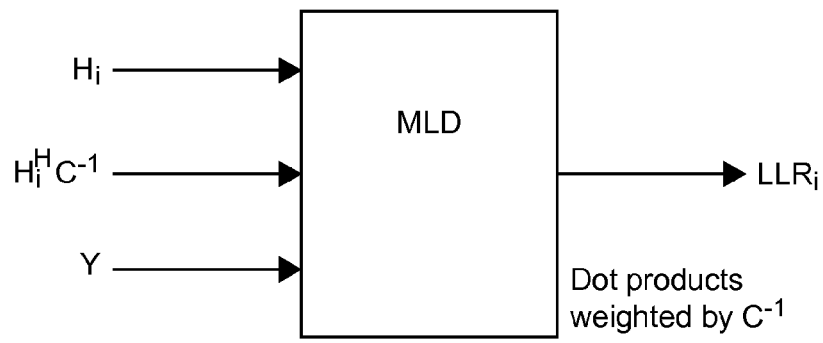
FIGS. 3 and 4 illustrate two different examples of the disclosure.

The general principal of an exemplary aspect of the disclosure relies on the combination of two aspects applied on at least one layer of the data signal to be decoded. The first aspect is based on a selecting step, which selects one candidate value for a data symbol of a current layer. And the second aspect is based on the use of predetermined constant depending on the size of the constellation of a considered layer, called a constellation dependent constant in a step of determining distance in a particular expression of the Euclidian distance between the received signal Y and said candidate value multiplied by said channel matrix H, weighted by the inverse of a noise covariance matrix C.

These two aspects taken in combination leads to an efficient reduction of the complexity of the method of decoding in comparison with classical method of decoding based on a maximum likelihood technique detection. Indeed, all the classical complex computations are replaced by a few primary dot products of channel and data vectors. In addition, colored noise is automatically and cheaply handled by replacing the primary dot products with inverse noise covariance weighted dot products, of the type $H^H C^{-1} Y$ and $W_i^H C^{-1} H_j$.

2. Detailed Description of a General Embodiment of the Disclosure

Referring to FIG. 2, we now present the mains steps of the method for decoding according to one general embodiment of the disclosure, considering that the data signal comprises at least one layer.

According to this embodiment, considering that the data signal comprises data symbol transmitted in at least one layer, the method comprises, for one of said at least one layer, called a current layer n, a detection step (200).

Such a detection step (200) comprises two substeps:
selecting (21) one candidate value for the data symbol of the current layer n,
determining (22) the Euclidian distance between the received signal Y and the data signal transmitted using said candidate value multiplied by said channel matrix H, weighted by the inverse of a noise covariance matrix C such as $\|Y - \Sigma_i H_i x_i\|_{C^{-1}}^2$, expressed as:

$\Sigma_{i \neq n} \|H_i\|_{C^{-1}}^2 |x_i|^2 - 2\Re(H_i^H C^{-1} Y - 0.5\Sigma_{j \neq i,n} H_i^H C^{-1} H_j x_j) x^*_i + \|H_n\|_{C^{-1}}^2 |x_n|^2 - 2\Re(H_n^H C^{-1} Y - \Sigma_{j \neq n} H_n^H C^{-1} H_j x_j) x^*_n = \Sigma_{i \neq n} \alpha_i^R (\Re x_i)^2 - 2\beta_i^R \Re x_i + \alpha_n^R (\Re x_n)^2 - 2\beta_n^R \Re x_n + \Sigma_{i \neq n} \alpha_i^I (\Im x_i)^2 - 2\beta_i^I \Im x_i + \alpha_n^I (\Im x_n)^2 - 2\beta_n^I \Im x_n$.

wherein the terms depending on $\alpha_k$ are computed by adding (220) to each of them a predetermined constant depending on the size of the constellation of the layer k, called a constellation dependent constant.

Indeed, for any type of equalizer implemented in a decoder, given an observation vector Y, the general solution is to find each symbol $x_i$ per layer from the transmitter's constellation of symbols per layer, that minimizes the weighted distance between the two vectors $\|Y - \Sigma_i H_i x_i\|_{C^{-1}}^2$. In other words the purpose of the detection step is to find the hypothetical transmitted candidate that is the nearest to the received vector while taking into account the noise that is added during the reception.

In this way, the step of selecting (21) aims at finding one candidate value for the symbol $x_n$ of the layer n. The way of implementing such a step of selecting is described with more details in the sections below regarding a first example of the present disclosure.

As already said such a step permits to fix one value for the symbol $x_n$ among the whole possible values of the constellation of the layer n.

Thus, such a step avoids the test of all the possible values of the constellation of a layer n since only one value is tested among all the values of the possible values of the constellation, which results in reducing the complexity of the maximum likelihood processing.

In the second substep, the step of determining (22) the Euclidian distance between the received signal Y and the data signal transmitted using said candidate value $x_n$.

The candidate value $x_n$, which has been previously selected by the substep of selecting (21), is used to obtain the $x_k$ of each other layer k different from the layer n when considering that the data signal comprises data symbol transmitted over a plurality of layers.

In this way, considering a data signal containing for example five layers called layer 0, layer 1, layer 2, layer 3, and layer 4, the value of $x_4$ is set thanks to the step of selecting, and then $x_4$ is used to find the optimized symbol values $x_0, x_1, x_2, x_3$ among each constellation of each layer respectively. Here, it is said that layer 0, layer 1, layer 2 and layer 3 are the layers of interest whereas layer 4 is the current layer, which is fixed to help determining the symbols of the other layers.

Indeed, the minimum Euclidian distance is taken over all possible constellation values $x_i$ and $x_j$. For example, if the layer i is of the type 64 QAM, there are 64 possible constellation values.

Considering the special case in which the data signal comprises data symbol transmitted over a single layer, the step of determining the Euclidian distance is used as an input for a refinement step implemented for example according to a turbo-decoding.

As can be seen, the substep of determining (22) an Euclidian distance is performed by using a particular expression of the Euclidian distance and by adding (220) to each of them a predetermined constant depending on the size of the constellation of the layer k, called a constellation dependent constant.

As already mentioned above, such a predetermined constellation dependent constant can be viewed as a "virtual term". Adding and subtracting such "virtual terms", based on constellation type, helps as explained in the following to eliminate multiplications or transform them into one, two or few additions, which is simpler in terms of complexity.

Then and optionally, a soft-bit decision step is performed to get the probabilities of the bit values of $x_0$, $x_1$, $x_2$, $x_3$, the same substeps are repeated considering one of the layers among layer 0, layer 1, layer 2 and layer 3 as the current layer for which the candidate value will be selected to get the probabilities of the bit values of $x_4$.

For example, layer 2 is considered as the current layer. The value of $x_2$ is set thanks to the step of selecting and then used to find the probabilities of the bit values $x_0$, $x_1$, $x_3$, and especially $x_4$ a step of soft-bit decision is performed delivering in particular the probabilities of the bit values of $x_4$.

Thus, after for example two iterations of the substeps including a step of soft-bit decision, all the probabilities of the bit values of $x_0$, $x_1$, $x_2$, $x_3$ and $x_4$ are obtained.

It is important to note that independently from the number of layers involved in the transmissions, for each layer the substeps described above are implemented.

Different ways of implementing such substeps are now described considering several different embodiments.

In this embodiment the general expression given above is simplified as a function of the number of the considered layers of the data signal.

A first embodiment is described considering that the data signal comprises data symbol transmitted over a single layer.

A second embodiment considers that the data signal comprises data symbol transmitted over two layers.

A third embodiment considers that the data signal comprises data symbol transmitted over N>2 layers, and that these N layers are processed two layers by two layers or more in a plurality S of iterations. According to this embodiment, in each iteration, it is "approximately" considered that the data signal comprises data symbols transmitted in two or more layers instead of N layers, the other layers being integrated in the noise covariance matrix.

Note that in the following, the focus is on 64QAM constellation but the adaptation to other QAM constellation orders is straightforward. In addition it is focused on soft decision Log Likelihood Ratio (LLR) metrics, which implicitly also cover the hard decision metrics.

3. Detailed Description of a First Embodiment Considering that the Data Signal Comprises Data Symbol Transmitted Over a Single Layer In this embodiment, it is considered that the data signal comprises data symbol x transmitted over a single layer. Thus regarding the general expression given above simplifications can be made since there is no interfering layer. In other terms $i=j=n=0$ and $\alpha_k = \alpha_0 = \alpha = \|H_0\|^2 {}_{C^{-1}} \beta_{1 \neq n}{}^R = \Re\, H_0^H C^{-1} Y$ and, $\beta_{i \neq n}{}^I = \Im\, H_0^H C^{-1} Y$.

Indeed, in this case regarding FIG. 3, the expression of the received signal can be expressed as;

$$Y = Hx + B$$

where x is the information symbol, a complex scalar, H the channel vector ($n_r \times 1$), B the noise vector ($n_r \times 1$), Y the received vector ($n_r \times 1$), and $n_r$ is the number of observations or number of receive antennas. Symbol $x = \Re x + j \Im x$ is a constellation symbol carrying P bits mapped to the real or imaginary axis. The noise covariance matrix is C and is for example equal to $\sigma^2 I$.

Let $L_b$ be the Log Likelihood Ratio (LLR) of bit b in symbol x. The Max-Log-MAP Log Likelihood Ratio (LLR) is:

$$L_b = \min_{x_{b:1}} \frac{1}{\sigma^2} \|Y - Hx\|^2 - \min_{x'_{b:0}} \frac{1}{\sigma^2} \|Y - Hx'\|^2$$

where the minima are taken over all possible constellation values x, respectively x', subject to bit b is equal to 1, respectively 0.

The norm can be developed as $$\frac{1}{\sigma^2} \|Y - Hx\|^2 = \frac{1}{\sigma^2}(\|Y\|^2 + \|H\|^2 |x|^2 - 2\Re\, H^H Y x^*)$$

Any constant term independent of the minimization, such as $\|Y\|^2$, cancels out after subtracting the two minima. Hence, it is sufficient to consider the norm:

$$\frac{1}{\sigma^2}(\|H\|^2 |x|^2 - 2\Re\, H^H Y x^*)$$

As can be seen, such expression has much lower implementation complexity regarding the classical expression of Zero-Forcing (ZF) solution of the prior art $$\frac{\|H\|^2}{\sigma^2} \left| \frac{H^H Y}{\|H\|^2} - x \right|^2.$$

Indeed, such expression does not require divisions and multiplications except for the primary dot products, $H^H Y$ and $\|H\|^2$.

Furthermore, such expression is the sum of real and imaginary parts:

$$\frac{1}{\sigma^2}(\|H\|^2(\Re x)^2 - 2\Re\, H^H Y \Re x) + \frac{1}{\sigma^2}(\|H\|^2(\Im x)^2 - 2\Im\, H^H Y \Im x).$$

Considering for example a bit mapped to the real axis, the variable $\Re x$ is independent of variable $\Im x$, which permits minimizing the real part separately (and vice versa). In the next subsections, a focus is made on the variable $\Re x$ but the same can be inferred directly and unambiguously for variable $\Im x$.

3.1 The Substep of Selecting (21)

Considering that according to an aspect of the disclosure, the real part can be expressed as:

$$\frac{1}{\sigma^2}(\|H\|^2(\Re x)^2 - 2\Re H^H Y \Re x) \equiv \alpha(\Re x)^2 - 2\beta \Re x$$

with $$\alpha \equiv \frac{1}{\sigma^2}\|H\|^2, \beta \equiv \Re \frac{1}{\sigma^2} H^H Y,$$

it is possible to determine the best $\Re x$ and corresponding minimum norm by implementing simple shifts registers, which implement some operations of multiplication or division by powers of two, additions and comparisons, assuming $\Re x \in \{\pm 1, \pm 3, \pm 5, +7 \ldots\}$, $(\Re x)^2 \in \{1, 9, 25, 49, \ldots\}$. This assumption requires pre-normalization, for example of H, by the constellation's Root Mean Square (RMS).

By multiplying $\alpha(\Re x)^2 - 2\beta \Re x$ with the positive constant $\alpha$ then adding the constant $\beta^2$, the best $\Re x$ is obtained as the $\min_{\Re_x}|\alpha \Re x - \beta|$. Hence, the step of selecting consists in finding the $\alpha \Re x$ that is nearest to $\beta$, or equivalently finding the decision region containing $\beta$, where the decision regions are bounded by $\{\ldots, -6\alpha, -4\alpha, -2\alpha, 0, 2\alpha, 4\alpha, 6\alpha, \ldots\}$.

According to an example, the step of selecting implements a hard-symbol slicing that selects the nearest symbol on the real (or imaginary) axis. For instance, for 64QAM there are eight decision regions. A binary search with three comparisons can quickly yield the result. An example of binary search for 64QAM: $\beta > 0$ then $\beta < 4\alpha$ then $\beta > 2\alpha$, yielding $\beta \in [2\alpha, 4\alpha]$ and $\Re x = 3$.

3.2 The Substep of Determining (22)

After the previous step of slicing delivering $\Re x$ (respectively $\Im x$), the step of determining (22) the Euclidian distance between the received signal Y and the data signal transmitted using said candidate value multiplied by said channel matrix H, weighted by the inverse of a noise covariance matrix C according to an aspect of the disclosure is performed by using the following expression: $\alpha(\Re x)^2 - 2\beta \Re x$.

Especially, according to an aspect of the disclosure, the terms depending on $\alpha$ are computed by adding (220) to each of them a predetermined constant depending on the size of the constellation of the layer k, called a constellation dependent constant. In other words, it is proposed to "virtually" add or subtract constant terms from both minima to further reduce the norm's complexity.

For instance, for a 64QAM constellation, by subtracting from the norm the constellation dependent constant $25\|H\|^2 \equiv 25\alpha$, a set of terms easier to compute is obtained: $\alpha((\Re x)^2 - 25) \in \{0, -16\alpha, \pm 24\alpha\}$ The subtraction of the constellation dependent constant $25\alpha$ does not alter the Log Likelihood Ratio (LLR) value.

According to other examples, for both a QPSK and a 16QAM $\|H\|^2$ can be subtracted to obtain, respectively, the sets $\alpha((\Re x)^2 - 1) \in \{0\}$ and $\alpha((\Re x)^2 - 1) \in \{0, 8\alpha\}$.

According to another example, for a 16QAM, $5\|H\|^2$ could be alternatively subtracted to obtain the set $\alpha((\Re x)^2 - 5) \in \{-4\alpha, 4\alpha\}$.

Thus, a rule can be applied, which consists in subtracting a "virtual" number, called a constellation dependent constant, to reduce the total number of bits in the binary representation of the resulting set of norms (hence minimizing number of additions), and in considering that negative numbers can be obtained from positive numbers with a simple negation operation.

In a complementary and optimal way, an aspect of the disclosure proposes to maintain some symmetry between positive and negative numbers in order to reduce the dynamic range of the norms (for fixed pointing considerations). An optimized constellation dependent constant to subtract in this case is the mid-range $(1+\max(\Re x)^2)/2$, which makes the positive and negative dynamic ranges equal. For instance, this number is 1 for QPSK, 5 for 16QAM, 25 for 64QAM, 113 for 256QAM, 481 for 1024QAM, etc.

Likewise and considering the same example based on a 64QAM constellation, an enhancement can be achieved by subtracting the constant term $2\Re H^H Y \in 2\beta$ then $2\beta(\Re x+1) \in \{0, \pm 4\beta, \pm 8\beta, \pm 12\beta, 16\beta\}$ and consists of one addition, two negations and plain shifts. For QPSK and 16QAM respectively, the sets $2\beta(\Re x+1) \in \{0, 4\beta\}$ and $2\beta(\Re x+1) \in \{0, \pm 4\beta, 8\beta\}$ are obtained.

Moreover, scaling by $1/\sigma^2$ can be either applied to the output Log Likelihood Ratio (LLR), or embedded in the two primary dot products, $$\frac{H^H Y}{\sigma^2} \text{ and } \frac{\|H\|^2}{\sigma^2}$$

(e.g. by scaling $$\left(e.g. \text{ by scaling } \frac{H^H}{\sigma^2}\right).$$

For a fixed point precision, one exponent for the full block of symbols can be used to handle large variations in signal to noise ratio (SNR) between blocks.

The step of determining (22) delivers a Euclidian distance for a data signal that comprises data symbols transmitted over a single layer. Such a Euclidian distance is then used for an enhancement step using for instance turbo-decoding.

3.3 Implementing a Soft-Bit Decision

According to another example, a soft-decision is obtained for some bits (bit interleaved coded modulation) by subtracting the distances of two previous hard-decisions using a hard-symbol slicing as described above (where the two hard-decisions are obtained from two distinct constellations, e.g. one constellation for the bit equal to 0, and the other constellation for the bit equal to 1).

For instance, for each bit b fixed to either 1 or 0, a subset of allowed symbols is obtained. For each subset, selecting the nearest symbol is implemented using a hard-symbol slicer. For instance, for Gray coded 64QAM, there are three bits per dimension with values 0 or 1, hence six subsets. Each subset is given by a row in table

| 1xx | −7 | −5 | −3 | −1 | . | . | . | . |
|---|---|---|---|---|---|---|---|---|
| 0xx | . | . | . | . | +1 | +3 | +5 | +7 |
| x1x | −7 | −5 | . | . | . | . | +5 | +7 |
| x0x | . | . | −3 | −1 | +1 | +3 | . | . |
| xx1 | −7 | . | . | −1 | +1 | . | . | +7 |
| xx0 | . | −5 | −3 | . | . | +3 | +5 | . | where x is "a don't care" bit. A fast solution for slicing all six subsets at once is to use the result from the hard-symbol slicer described above; the index of the hard-symbol is equal to the index of the "winning" column in table. For example, if the symbol selected thanks to the hard-symbol slicer has a real part equal to −5, the "winning" column is the second column with an index equal to two.

| −7 | −5 | −3 | −1 | −1 | −1 | −1 | −1 |
| +1 | +1 | +1 | +1 | +1 | +3 | +5 | +7 |
| −7 | −5 | −5 | −5 | +5 | +5 | +5 | +7 |
| −3 | −3 | −3 | −1 | +1 | +3 | +3 | +3 |
| −7 | −7 | −1 | −1 | +1 | +1 | +7 | +7 |
| −5 | −5 | −3 | −3 | +3 | +3 | +5 | +5 | where empty locations in the table have been filled out with the nearest allowed symbol. For example, if the sliced hard-symbol is $\Re x=-7$, i.e. the first constellation symbol, then the first column is the winning column. The table can consist of indexes rather than symbol values.

3.4 Taking Account of a Colored Noise or Interference.

In the presence of colored noise or interference with covariance matrix C, the Max-Log-MAP Log Likelihood Ratio (LLR) with interference mitigation is:

$$L_b = \min_{x_{b:1}} \|Y-Hx\|_{C^{-1}}^2 - \min_{x'_{b:0}} \|Y-Hx'\|_{C^{-1}}^2,$$

where the notation with subscript $C^{-1}$ indicates weighted norm, $$\|X\|_{C^{-1}}^2 = X^H C^{-1} X$$

The only change with respect to a Gaussian Noise, is the replacement of the two terms $$\frac{\|H\|^2}{\sigma^2} \text{ and } \frac{H^H Y}{\sigma^2}$$

respectively by the two terms $H^H C^{-1} H$ and $H^H C^{-1} Y$.

Thus, taking into account a colored noise instead of a Gaussian noise involves replacing the two primary dot products by weighted dot products. Consequently, for minimal complexity and power consumption, the data path Y is unaltered while the channel estimation path is modified to provide H and $C^{-1}H$ (for fixed point, a per-block exponent can handle large variations of signal o noise ratio (SNR) between blocks).

In comparison with the proposed solution of an aspect of the disclosure for taking into account a colored noise, noise pre-whitening has higher complexity and power consumption since it requires a Cholesky decomposition and it is applied to the data path.

Moreover, since $C^{-1}$ and H are slowly changing signals, $C^{-1}H$ can be (approximately) interpolated to adjacent symbols or subcarriers, similarly to H, which can dramatically reduce complexity of this product. This is illustrated in 3. The interpolation trick cannot be used by the Cholesky decomposition $C^{-1/2}$ applied to the data path, $C^{-1/2}Y$, since Y is a fast varying signal.

3.5 Application of an Aspect of the Disclosure in a Linear Minimum Mean Square Error Leading to a Reduced Complexity The classical linear Minimum Mean Square Error (MMSE) equalizer for multi-layers can be expressed using the expressions stated above for a data signal comprising data symbols transmitted over one single layer for a selected layer $x_i$ to decode, while the remaining layers other than the one processed as described above are treated as Gaussian distributed colored noise.

Such an implementation of the Minimum Mean Square Error (MMSE) equalizer is lower cost than the traditional unbiased Minimum Mean Square Error (MMSE) with signal to noise ratio (SNR) weighting.

In this application, a unique matrix can be inverted, which is $R_{YY} = C + \Sigma_i H_i H_i^H$, i.e. it contains all layers plus noise (received signal covariance matrix whose statistical average is $EYY^H$). Then a layer of interest $x_i$ is subtracted by using a matrix inversion lemma valid for any primary dot product and for any vector V, $$H_i^H (R_{YY} - H_i H_i^H)^{-1} V = \frac{1}{1-\gamma_i} H_i^H R_{YY}^{-1} V,$$

where $\gamma_i = H_i^H R_{YY}^{-1} H_i$ is a constant real scalar. Scaling by $$\frac{1}{1-\gamma_i}$$

is necessary (for proper weighting), whereas the traditional Minimum Mean Square Error (MMSE) filter for layer i is $$SNR_i = \frac{\alpha_i}{1-\alpha_i}$$

is the layer's signal to noise ratio (SNR) after equalization.

Thus, for a two antennas receiver, inverting 2×2 matrix $R_{YY}^{-1}$ requires inverting the determinant of $R_{YY}^{-1}$. This division operation can be merged with $$\frac{1}{1-\alpha_i}$$

to produce a unique division per layer i. This saves one division compared to the traditional method of post-weighting by signal to noise ratios i ($SNR_i$) (total of 2 divisions instead of 3).

4. Detailed Description of a Second Embodiment Considering that the Data Signal Comprises Data Symbol Transmitted Over Two Layers In this embodiment, thus regarding the general expression given above simplifications can be made since et i=j, et i,n∈{0, 1} $\alpha_k = \|H_k\|^2_{C^{-1}}$, $\beta_{i \neq n}^R = \Re H_i^H C^{-1} Y$, $\beta_n^R = \Re H_n^H C^{-1} Y - \Re H_n^H C^{-1} H_i x_i$, $\beta_{i \neq n}^I = \Im H_i^H C^{-1} Y$ and $\beta_n^I = \Im H_n^H C^{-1} Y - \Im H_n^H C^{-1} H_i x_i$.

In other words, it is considered that the data signal comprises data symbol x transmitted over two layers layer 0 and layer 1 with for each layer possibly different constellation order, and considering that each layer is carried by its own beam or channel, $H_0$ and $H_1$, $$Y = H_0 x_0 + H_1 x_1 + B.$$

For the first layer, let $L_{0b}$ be the Log Likelihood Ratio (LLR) of bit b in symbol $x_0$. For the second layer, let $L_{1b}$ be the Log Likelihood Ratio (LLR) of bit b in symbol $x_1$. For instance, the first layer 0 is considered to be the layer of interest, in other terms the layer for which it is desired to obtain the optimized value of the symbol $x_0$.

The second layer 1 can be obtained by reversing the roles of first and second layers. In some cases, the second layer is an unwanted interferer and there is no need to compute $L_{1b}$. For symbol $x_0$, the Max-Log-MAP Log Likelihood Ratio (LLR) with colored interference is:

$$L_{0b} = \min_{x_{0b:1}, x_1} \|Y - H_0 x_0 - H_1 x_1\|^2_{C^{-1}} - \min_{x_{0b:0}, x_1} \|Y - H_0 x'_0 - H_1 x'_1\|^2_{C^{-1}}$$

where the minima are taken over all possible constellation values $x_0$, $x_1$ subject to bit b of symbol $x_0$ is equal to 1, and over all possible constellation values $x'_0$, $x'_1$ subject to bit b of symbol $x_0$ is equal to 0.

In the following, for a simpler notation, $C^{-1}$ is omitted from the dot products but it is implicitly assumed that all dot products and norms are weighted by $C^{-1}$, in particular the five primary dot products $\|H_0\|_{C^{-1}}^2$, $\|H_1\|_{C^{-1}}^2$, $H_0^H C^{-1} Y$, $H_1^H C^{-1} Y$, $H_1^H C^{-1} H_0$.

To find $L_{0b}$, the two substeps of selecting (21) and determining an Euclidian distance (22) are performed. In the following, for a layer k, K is the constellation size, e.g. K=64.

4.1 The Substep of Selecting (21)

According to an aspect of the disclosure, the substep of selecting consists in choosing a candidate value for the layer 1 by using for example a hard-symbol slicer.

Thus, such a substep of selecting delivers the symbol $x_1$ that is used subsequently in the substep of determining an Euclidian distance to determine the optimized symbol $x_0$.

Note that $x_1$ comes from constellation of layer 1, which can have different constellation order than constellation of layer 0. For example, the constellation of layer 1 is 64QAM, whereas the constellation of layer 0 is QPSK.

Such a selection reduces the number of operations since it avoids the test of all the possible values of the constellation of the layer 1 since only one value is tested among all the values of the possible values of the constellation.

4.2 The Substep of Determining (22)

Once the candidate value $x_1$ has been fixed, the method involves computing K Euclidian distance or norms, for each constellation symbol $x_{0p}$ (p=0 . . . K-1), $\|Y_k - (H_0 x_0 + H_1 x_1)\|^2$, According to an aspect of the disclosure, for each $x_{0k}$, the norm $2\Re H_0^H Y x^*_{0k} + \|H_1\|^2 |x_1|^2 - 2\Re H_1^H Y_k x^*_1$, where the constant term $\|Y\|^2$ has been ignored (indeed it vanishes after subtraction of the two minima), and where $Y_k = Y - H_0 x_{0k}$.

Such expression is easier to implement since it requires less complex operations.

In addition, according to an aspect of the disclosure and considering the example of a 64QAM for layer 0 and layer 1, a constellation dependent constant equal to 25 is added and/or subtracted and the terms $\Re x_{0k}$, $\Re x_1$ (and intermediate $x_{0k}$) are regrouped as following for the real part:

$\|H_0\|^2((\Re x_{0k})^2 - 25) - 2(\Re H_0^H Y + \Re H_1^H H_0 + \Im H_1^H H_0)(\Re x_{0k} + 1) + \|H_1\|^2((\Re x_1)^2 - 25) - 2(\Re H_1^H Y - \Re H_1^H H_0 x_{0k})(\Re x_1 + 1) \equiv \alpha_0((\Re x_{0k})^2 - 25) - 2\beta_0^R(\Re x_{0k} + 1) + \alpha_1((\Re x_1)^2 - 25) - 2\beta_{1k}^R(\Re x_1 + 1)$, and for the imaginary part a similar expression can obtained starting from the imaginary expression:

$\|H_0\|^2((\Im x_{0k})^2 - 25) - 2(\Im H_0^H Y + \Re H_1^H H_0 - \Im H_1^H H_0)(\Im x_{0k} + 1) + \|H_1\|^2((\Im x_1)^2 - 25) - 2(\Im H_1^H Y - \Im H_1^H H_0 x_{0k})(\Im x_1 + 1) \equiv \alpha_0(\Im x_{0k})^2 - 25) - 2\beta_0^I(\Im x_{0k} + 1) + \alpha_1((\Im x_1)^2 - 25) - 2\beta_{1k}^I(\Im x_1 + 1)$, Considering other examples, like a QPSK or a 16QAM, the constellation dependent constant is respectively equal to 1 or 5.

For $x_{0k}$, the norm $\alpha_0((\Re x_{0k})^2 - 25) - 2\beta_0(\Re x_{0k} + 1)$ can be pre-computed with a few additions and then summed up for each combination of $\Re x_{0k}$, $\Im x_{0k}$ via 64 additions. The constellation dependent constant 25 of $\alpha_0((\Re x_{0k})^2 - 25) - 2\beta_0(\Re x_{0k} + 1)$ is obtained considering the constellation order of layer 0 as being 64QAM but would be different considering another constellation (QPSK, 16QAM, etc.) as already explained above.

For $x_1$, to save additions down the road, norm $\|H_1\|^2((\Im x_1)^2 - 25)$ for $\Re x_1$ and $\Im x_1$ can be summed and pre-stored for all combinations of $(\Re x_1)^2$ and $(\Im x_1)^2$.

Then for a given $x_{0k}$ and after selecting (21) the candidate value for $x_1$, norm $\alpha_1((\Im x_1)^2 - 25) - 2\beta_1(\Im x_1 + 1)$ can be obtained via maximum four additions, or an average two and a half additions (including adding up the norms for $\Re x_1$ and $\Im x_1$, and norm $\|H_1\|^2((\Im x_1)^2 - 25)$).

Since there are 64 values of $x_{0k}$, then a maximum of 4×64 additions is obtained. Note that the constellation dependent constant 25 of $\alpha_1((\Im x_1)^2 - 25) - 2\beta_1(\Im x_1 + 1)$ is obtained considering the constellation order of layer 1 as being 64QAM but would be different considering another constellation (QPSK, 16QAM, etc.) as already explained above.

The last remaining terms to be computed are $\beta_{1k}^R$ and $\beta_{1k}^I$, expressed as following:

$\Re H_1^H Y - \Re H_1^H H_0 x_{0k} = \Re H_1^H Y - \Re H_1^H H_0 \Re x_{0k} + \Im H_1^H H_0 \Im x_{0k}$ and it can be rearranged as $(\Re H_1^H Y + \Re H_1^H H_0 - \Im H_1^H H_0) - \Re H_1^H H_0 (\Re x_{0k} + 1) + \Im H_1^H H_0 (\Im x_{0k} + 1)$, and for the imaginary part:

$\Im H_1^H Y - \Im H_1^H H_0 x_{0k} = \Im H_1^H Y - \Re H_1^H H_0 \Im x_{0k} - \Im H_1^H H_0 \Re x_{0k}$ rearranged as $\Im H_1^H Y - \Re H_1^H H_0 + \Im H_1^H H_0) - \Re H_1^H H_0 (\Im x_{0k} + 1) - \Im H_1^H H_0 (\Re x_{0k} + 1)$.

In these above expressions terms similar to $2(\Re H_0^H Y + \Re H_1^H H_0 + \Im H_1^H H_0)(\Re x_{0k} + 1)$ that can be pre-computed for $\Re x_{0k}$ and $\Im x_{0k}$ and then summed for all combinations of the two variables, i.e. 64 additions for $\Re x_1$, and another 64 additions for $\Im x_1$, hence 2×64 additions.

Finally, the sums $\alpha_0((\Re x_{0k})^2 - 25) - 2\beta_0(\Re x_{0k} + 1) + \alpha_1((\Re x_1)^2 - 25) - 2\beta_{1k}^R(\Re x_1 + 1)$ and $\alpha_0((\Im x_{0k})^2 - 25) - 2\beta_0(\Im x_{0k} + 1) + \alpha_1((\Im x_1)^2 - 25) - 2\beta_{1k}^I(\Im x_1 + 1)$ are respectively obtained using 64 additions for the real part and the imaginary part respectively.

In summary, for 64QAM the proposed maximum likelihood method for decoding according to an aspect of the disclosure requires 2×8×64=1024 additions for both $L_{0b}$ and $L_{1b}$, plus a few more in the pre-computing phase, and plus five primary dot products. More accurate complexity for 64QAM is 16R real multiplications and 1090+16$n_r$ real additions where $n_r$ is number of receiving antennas (excluding inverse noise covariance weighting).

In addition, advantageously, according to a variant of this method applied to a data signal comprising data symbols transmitted over two layers there are more simplifications.

Indeed, $\|H_0\|^2(\Re x_0)^2 - 2(\Re H_0^H Y)\Re x_0 + \|H_1\|^2(\Re x_1)^2 - 2(\Re H_1^H Y - \Re H_1^H H_0 x_0)\Re x_1$ can be reformulated considering that adding up $\Re x_0 + 1$ and $\Re x_1 + 1$ requires subtracting non-constant term $2\Re H_1^H H_0 x_0 = 2\Re H_1^H H_0 \Re x_0 - 2\Im H_1^H H_0 \Im x_0$ (dependent on $x_0$) from $\|H_1\|^2(\Re x_1)^2 - 2\Re H_1^H Y - \Re H_1^H H_0 x_0)\Re x_1$. The real variable in this term can be merged into $\|H_0\|^2(\Re x_0)^2 - 2(\Re H_0^H Y)\Re x_0$ while the imaginary variable is merged into the equivalent norm for $\Im x_0$ (not shown in our formulas). A term for the imaginary formula is obtained in a similar way (not shown here) to be merged into $\|H_0\|^2(\Re x_0)^2 - 2(\Re H_0^H Y)\Re x_0$. The terms to be merged into $\|H_0\|^2(\Re x_0)^2 - 2(\Re H_0^H Y)\Re x_0$ are $2\Re H_1^H H_0 \Re x_0$ and $+\Im H_1^H H_0 \Re x_0$. Thus, the following expression is obtained: $\|H_0\|^2(\Re x_0)^2 - 2(\Re H_0^H Y + \Re H_1^H H_0 + \Im H_1^H H_0)(\Re x_0 + 1) + \|H_1\|^2(\Re x_1)^2 - 2(\Re H_1^H Y - \Re H_1^H H_0 x_0)(\Re x_1 + 1)$ Then, the constellation dependant constant can be added as already described above.

4.3 Implementing a Soft-Bit Decision

Then and optionally, a soft-bit decision step is performed to get the probabilities of the bit values of the symbol of each layer.

In other words, the substeps of the method according to an aspect of the disclosure including a step of soft-bit decision are first implemented considering that the current layer is layer 0, which delivers the probabilities of the bit values of $x_0$, and then repeated considering that the current layer is layer 1, which delivers the probabilities of the bit values of $x_1$. In other words, the "roles" of the layer 0 and of the layer 1 are reversed.

5. Detailed Description of a Third Embodiment Considering the Data Signal Comprises Data Symbol Transmitted Over N>2 Layers, and that these N Layers are Processed for Example Two Layers by Two Layers in N Iterations Such an embodiment is a variant to process a signal comprising data symbols transmitted in more than two layers and is illustrated by FIG. 4.

More precisely, according to this embodiment, when said signal comprises a set of data symbols transmitted in N>2 layers, the method comprises S≤N iterations, each iteration processing Q<N layers, while the other (N-Q) layers are included in said covariance matrix C, and delivering transmitted symbols of R≤(Q−1) layers of said Q first layers, called resulting layers, one iteration processing Q layers being different from the resulting layers issued by the previous iterations, Q, R, S being integers able to be different from one iteration to the other.

Figure 4:
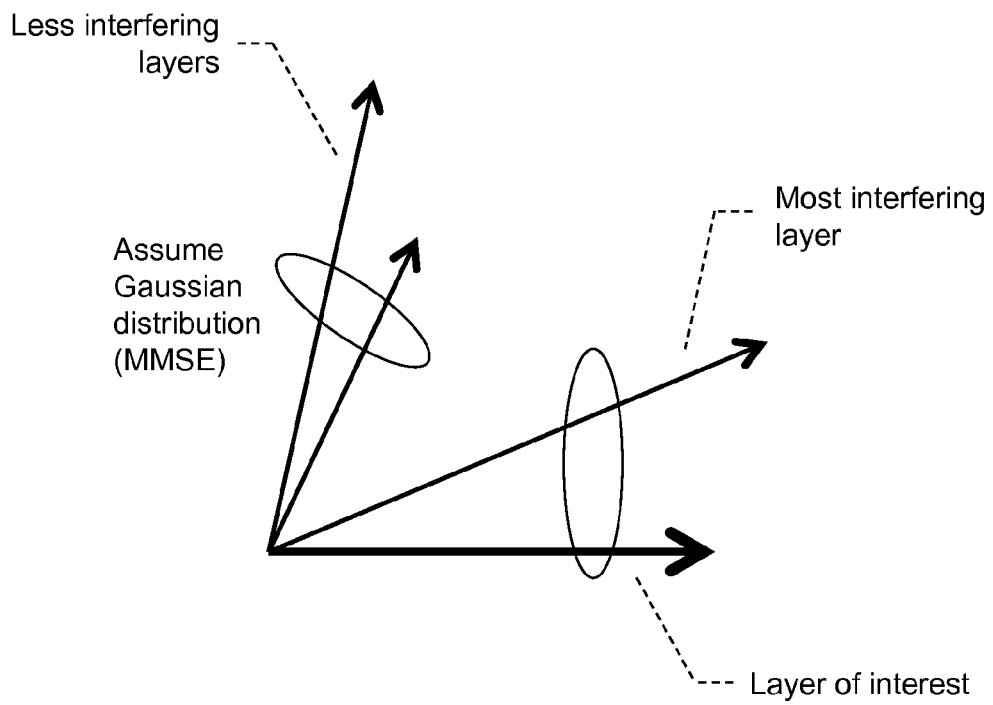

In particular, FIG. 4 represents an example of such embodiment where Q=2.

Such embodiment permits to obtain the whole N optimized values by processing the layers two layers by two layers in N iterations. Such a process permits to reduce the complexity of an iteration since as seen above processing a data signal comprising symbols transmitted over two layers involves les complex operations than processing a data signal comprising symbols transmitted over N layers.

Such embodiment is particularly adapted when some of the transmitted layers have a QAM (quadrature amplitude modulation) constellation distribution and some have Gaussian distribution, and permits to use an hybrid detector using both maximum likelihood detection (MLD) and Minimum Mean Square Error (MMSE).

It consists in finding the nearest points in a multi-dimensional constellation with the distances weighted by colored Gaussian noise. This detector can be implemented as maximum likelihood detection (MLD) for the non-Gaussian layers while using a colored noise covariance matrix that includes the remaining Gaussian layers. I.e. Minimum Mean Square Error (MMSE) equalization of Gaussian layers is incorporated in the noise covariance matrix.

To reduce maximum likelihood detection (MLD) complexity, some of the less interfering layers can be approximated with a Gaussian distribution since Minimum Mean Square Error (MMSE) equalization is less costly.

In fact, traditional Minimum Mean Square Error (MMSE) equalizer implicitly isolates one layer of interest and treats all remaining layers as colored Gaussian noise. Minimum Mean Square Error (MMSE) equalizer can thus be viewed as implementing the method described in the first embodiment for a data signal comprising data symbols transmitted in a single layer with the remaining layers included in the noise covariance. The operation is repeated for each layer of interest.

Here such a classical principle of the Minimum Mean Square Error (MMSE) equalizer is extended to process two (or more for example a number of layers equal to Q<N, where Q is an integer superior to two) layers for delivering a given layer of interest, treating the two (or more) isolated layers with the maximum likelihood technique of an aspect of the disclosure as described in the second embodiment, and the remaining layers with Minimum Mean Square Error (MMSE) as colored Gaussian noise. The operation is repeated for each layer of interest.

For example, such a hybrid combination of the maximum likelihood detection (MLD) and Minimum Mean Square Error (MMSE) can be combined to achieve multi-layer detection.

As illustrated by FIG. 4, the multiple layers are split into two groups: two layers are selectively picked for the maximum likelihood detection according to the second embodiment, and the additional layers are processed as colored interference with known covariance matrix (Minimum Mean Square Error (MMSE) group).

The Minimum Mean Square Error (MMSE) group is essentially treated similarly to linear Minimum Mean Square Error (MMSE) equalization, and it implicitly assumes Gaussian distribution of the symbol carried by each layer.

For the maximum likelihood detection (MLD) group, the first selected layer, $H_i x_i$, is the layer to decode, i.e. the layer of interest. The second selected layer, $H_j x_j$, is, for example, the layer that interferes most with the first layer (constellation order can also be part of the selection criteria: selecting an interfering layer with a low constellation order improves maximum likelihood detection (MLD) robustness, since Max-Log-MAP maximum likelihood detection (MLD) relies on selecting a candidate value for the interfering layer; a third criteria for the selection can be based on predicting the equalizer's output SNR per selection). The second layer will not be decoded at this point.

The layer that interferes most with first layer i is given by $$\max_{j \neq i} |H_i^H C^{-1} H_j|.$$

All remaining layers are treated as colored noise and included in the maximum likelihood detection according to the second embodiment by replacing the noise covariance matrix with $C_{ij} = C + \Sigma_{l \neq i,j} H_l H_l^H$. This colored covariance matrix implicitly assumes Minimum Mean Square Error equalization (MMSE) of the remaining layers given a layer of interest.

After the symbol $x_i$ is decoded, the steps of the method according to an aspect of the disclosure are performed for another layer that we wish to decode.

In principle, the algorithm requires several matrix inversions. But this can be resolved by:
inverting a unique signal covariance matrix $R_{YY}=C+\Sigma_i H_i H_i^H$ that contains all layers
subtracting layer of interest i via matrix inversion lemma $$C_i^{-1} = (R_{YY} - H_i H_i^H)^{-1} = R_{YY}^{-1} - \frac{1}{1-\alpha_i} H_i' H_i'^H$$

where $H'_i = (R_{YY}^{-1} H_i$ and $\alpha_i = H_i^H R_{YY}^{-1} H_i$; and
subtracting interfering layer j while performing primary dot products starting with $H_j^H$, again via matrix inversion lemma as shown in $$H_i^H (R_{YY} - H_i H_i^H)^{-1} V = \frac{1}{1-\gamma_i} H_i^H R_{YY}^{-1} V.$$

In other examples, a larger number Q of layers (3, 4, etc.) can be selected and processed thanks to the method according to an aspect of the disclosure, which uses a maximum likelihood detection and treat all remaining layers with Minimum Mean Square Error as if they were Gaussian distributed. In addition, Q can be different from one iteration to the other.

6. Detailed Description of a Variant of the Disclosure

In the previous description of embodiments, it is assumed that for all constellation symbols $x_i$ and $x_j$ different from the constellation symbol $x_n$, of the current layer n, an exhaustive search using a maximum likelihood technique for setting values of the constellation symbols $x_i$ and $x_j$.

Figure 5:
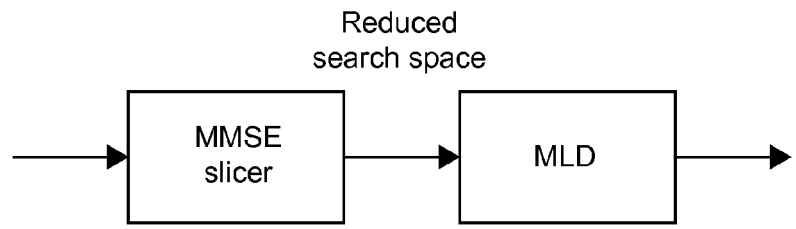
FIGS. 5 and 6 illustrate an optional substep of an aspect of the disclosure.

To further reduce the complexity of the method it is now assumed that for constellation symbols $x_i$ of at least one layer i different from the current layer n, a search is limited to a predetermined region of the constellation symbols $x_i$. Such a variant is represented by FIGS. 5 and 6.

More precisely, for example, a pre-stage using a Minimum Mean Square Error (MMSE) equalizer is used to select a subset (61) of candidate values for $x_0$ the symbol of the layer 0 of interest. This can be achieved, for example, by processing norm $\|H_0\|^2 |x_{0k}|^2 - 2\Re H_0^H Y x^*_{0k}$ as it is done according to the first embodiment of the disclosure considering that the data signal comprises data symbols transmitted in a single layer, while including the interfering layers such as $H_1$ in the noise covariance matrix to obtain, the noise covariance matrix $C' = R_{YY} - H_0 H_0^H$.

Figure 6:
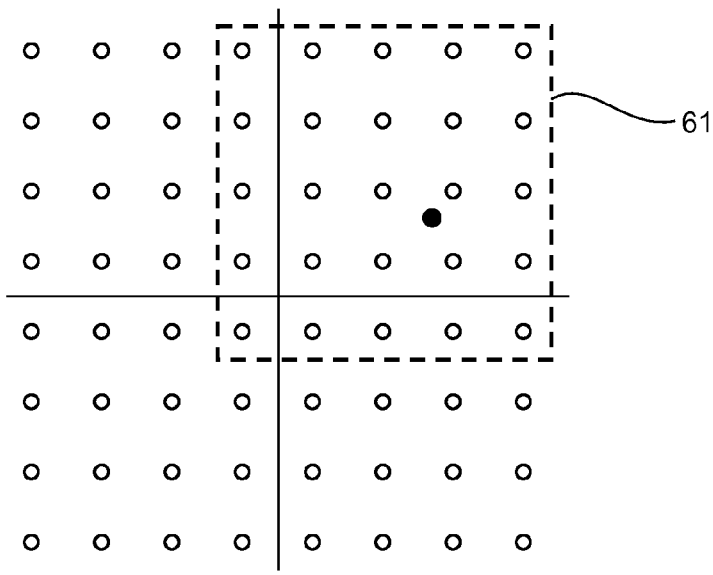

The subset of candidate values for $x_0$ is obtained using a hard-symbol slicer as described above, but instead of outputting one single hard-symbol, several nearest symbols are outputted; for example five nearest real symbols $\Re x_{0k}$ and five nearest imaginary symbols $\Im x_{0k}$ for a total of 25 symbols $x_{0k}$ (instead of 64 symbols for 64QAM) as shown in FIG. 6.

Then such a subset is used as an input of the maximum likelihood detection (MLD) method of the disclosure. It is a simple modification to the maximum likelihood detection (MLD) method and is particularly useful for processing multi-layers data signal or for large constellations, such as 1024QAM.

The solution can be viewed as a concatenation of Minimum Mean Square Error (MMSE) equalizer followed by maximum likelihood detection (MLD) according to an aspect of the disclosure on a reduced set as illustrated by FIG. 5.

The pre-stage of slicing $x_0$ essentially focuses on layer 0 while assuming other layers such as layer 1 as Gaussian distributed (Gaussian noise). It acts like Minimum Mean Square Error slicing but instead of limiting the number of outputs to a unique hard-symbol, it finds a square (or rectangular or circular . . . ) region around the initial Zero Forcing candidate as illustrated by FIG. 6.

The square region (61) is extended to other lattice dimensions for the other layers, and the overall search region has the shape of a hyper-parallelepiped (or hyper-cylinder).

Minimum Mean Square Error (MMSE) equalization can be efficiently performed as explained above, i.e. a unique matrix can be inverted, $R_{YY}=C+\Sigma_i H_i H_i^H$ and then a layer of interest is subtracted via a matrix inversion lemma applied to the primary dot products.

After the initial stage, the steps of the method according to an aspect of the disclosure are performed considering a current layer 1 for example, with a size of possible values $x_{0k}$ to parse, which is now 25 instead of 64, for example.

A reduction of about 50% is thus achieved in this example, traded against a slight performance loss.

An issue to keep in mind is that, if the search region is too tight, the minima search stage may not find any $x_{0k}$ available in the list for some bit b. A remedy is to carefully pick the near symbols (not always the nearest neighbors) in the constellation such that it is guaranteed that all bits b will have non-empty list of $x_{0k}$.

For instance, for 64QAM, choosing the five nearest constellation points guarantees non-empty lists.

If the search region is further tightened such that some lists remain empty, then a solution can be to use the Log Likelihood Ratio (LLR) that can be obtained from the pre-stage of MMSE (or to set the corresponding the Log Likelihood Ratio (LLR) to infinity).

7. Detailed Description of a Decoder According to an Aspect of the Disclosure Finally, referring to FIG. 7, the simplified structure is presented of a decoder respectively implementing a method for decoding as described here above.

Figure 7:
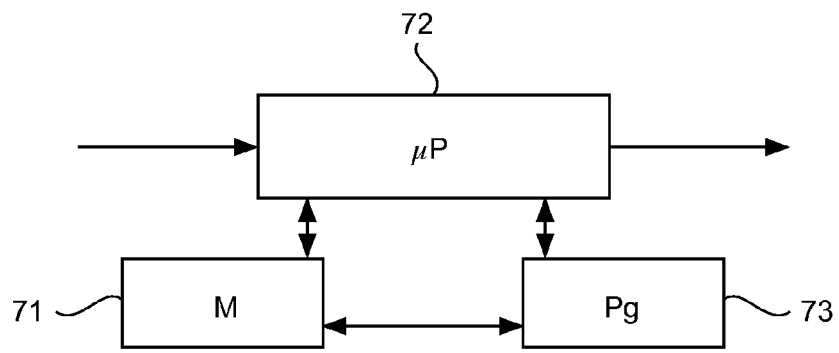
FIG. 7 presents the structure of a decoding device applying the decoding method.

An encoding device, as illustrated in FIG. 7, comprises a memory 71 comprising a buffer memory, a processing unit 72 equipped for example with a microprocessor μP and driven by the computer program 73, implementing the method for decoding according to an aspect of the disclosure.

At initialization, the code instructions of the computer program 73 are for example loaded into a RAM and then executed by the processor of the processing unit 72. The processing unit 72 receives a current data signal to be decoded. The microprocessor of the processing unit 62 implements the steps of the method for decoding described here above according to the computer program instructions 63 to encode the current image. To this end, the decoder comprises, in addition to the buffer memory 61, means for means for detecting that determines the maximum likelihood for at least one data symbol of said data signal. Said means for detecting comprises:
means for selecting one candidate value for the data symbol of the current layer n,
means for determining the Euclidian distance between the received signal Y and the data signal transmitted using said candidate value multiplied by said channel matrix H, weighted by the inverse of a noise covariance matrix C such as $\|Y - \Sigma_i H_i x_i\|_{C^{-1}}^2$, expressed as:

$$\sum_{i \neq n} \|H_i\|_{C^{-1}}^2 |x_i|^2 - 2\Re\left(H_i^H C^{-1} Y - 0.5 \sum_{j \neq i,n} H_i^H C^{-1} H_j x_j\right) x_i^* +$$

$$\|H_n\|_{C^{-1}}^2 |x_n|^2 - 2\Re\left(H_n^H C^{-1} Y - \sum_{j \neq n} H_n^H C^{-1} H_j x_j\right) x_n^* =$$

$$\sum_{i \neq n} \alpha_i^R (\Re x_i)^2 - 2\beta_i^R \Re x_i + \alpha_n^R (\Re x_n)^2 - 2\beta_n^R \Re x_n +$$

$$\sum_{i \neq n} \alpha_i^I (\Im x_i)^2 - 2\beta_i^I \Im x_i + \alpha_n^I (\Im x_n)^2 - 2\beta_n^I \Im x_n$$

wherein:
$H_k$ is a vector representing the channel associated to a layer k, with k∈{i, j, n}, i, j, n ∈[0, N−1], i, j, n being integers, possibly equal and N being the number of layers of said data signal;
$x_k$ is the constellation symbol of the layer k;

$\alpha_k^R = \alpha_k^I = \alpha_k = \|H_k\|^2_{C^{-1}}$, $\beta_{i \neq n}^R = \Re H_i^H C^{-1} Y - 0.5 \Sigma_{j \neq i,n} \Re H_i^H C^{-1} H_j x_j$, $\beta_{i \neq n}^I = \Im H_i^H C^{-1} Y - 0.5 \Sigma_{j \neq i,n} \Im H_i^H C^{-1} H_j x_j$, $\beta_n^R = \Re H_n^H C^{-1} Y - \Sigma_{j \neq n} \Re H_n^H C^{-1} H_j x_j$, $\beta_n^I = \Im H_n^H C^{-1} Y - \Sigma_{j \neq n} \Im H_n^H C^{-1} H_j x_j$, wherein the terms depending on $\alpha_k$ are computed by adding to each of them a predetermined constant depending on the size of the constellation of the layer k, called a constellation dependent constant.

These means are driven by the microprocessor of the processing unit 62.

Although the present disclosure has been described with reference to one or more examples, workers skilled in the art will recognize that changes may be made in form and detail without departing from the scope of the disclosure and/or the appended claims.

The invention claimed is:

1. A method for decoding a received signal Y corresponding to a data signal transmitted in a MIMO communication system through a channel represented by a channel matrix H, said data signal comprising a set of data symbols x transmitted in at least one layer, each layer carrying at least one data symbol belonging to a signal constellation, wherein said method comprises, for one of said at least one layer, called a current layer n:
 a detection step that determines the maximum likelihood for at least one data symbol of said data signal, wherein said detection step comprises:
 selecting one candidate value for the data symbol of the current layer n, and
 determining, with a processor, the Euclidian distance between the received signal Y and the data signal transmitted using said candidate value multiplied by said channel matrix H, weighted by the inverse of a noise covariance matrix C such as $\|Y - \Sigma_i H_i x_i\|_{C^{-1}}^2$, expressed as:

$$\sum_{i \neq n} \|H_i\|_{C^{-1}}^2 |x_i|^2 - 2\Re\left(H_i^H C^{-1} Y - 0.5 \sum_{j \neq i,n} H_i^H C^{-1} H_j x_j\right) x_i^* +$$

$$\|H_n\|_{C^{-1}}^2 |x_n|^2 - 2\Re\left(H_n^H C^{-1} Y - \sum_{j \neq n} H_n^H C^{-1} H_j x_j\right) x_n^* =$$

-continued $$\sum_{i \neq n} \alpha_i^R (\Re x_i)^2 - 2\beta_i^R \Re x_i + \alpha_n^R (\Re x_n)^2 - 2\beta_n^R \Re x_n +$$

$$\sum_{i \neq n} \alpha_i^I (\Im x_i)^2 - 2\beta_i^I \Im x_i + \alpha_n^I (\Im x_n)^2 - 2\beta_n^I \Im x_n$$

wherein:
$H_k$ is a vector representing the channel associated to a layer k, with k∈{i, j, n}, i, j, n∈[0, N−1], i, j, n being integers, possibly equal and N being the number of layers of said data signal;
$x_k$ is the constellation symbol of the layer k;

$\alpha_k^R = \alpha_k^I = \alpha_k = \|H_k\|^2_{C^{-1}}$, $\beta_{i \neq n}^R = \Re H_i^H C^{-1} Y - 0.5 \Sigma_{j \neq i,n} \Re H_i^H C^{-1} H_j x_j$, $\beta_{i \neq n}^I = \Im H_i^H C^{-1} Y - 0.5 \Sigma_{j \neq i,n} \Im H_i^H C^{-1} H_j x_j$, $\beta_n^R = \Re H_n^H C^{-1} Y - \Sigma_{j \neq n} \Re H_n^H C^{-1} H_j x_j$, $\beta_n^I = \Im H_n^H C^{-1} Y - \Sigma_{j \neq n} \Im H_n^H C^{-1} H_j x_j$, wherein the terms depending on $\alpha_k$ are computed by adding to each of them a predetermined constant depending on the size of the constellation of the layer k, called a constellation dependent constant.

2. The method for decoding according to claim 1, wherein said constellation dependent constant is equal to $(1+\max(\Re x)^2)/2$, where $\max(\Re x)$ corresponds to the maximum real part of the candidate values of said constellation of the layer k.

3. The method for decoding according to claim 1, wherein the terms depending on βk are computed by adding the constant 2.M.βk to each of them, where M is an integer.

4. The method for decoding according to claim 1, wherein the method comprises, for all constellation symbols $x_i$ and $x_j$ different from the constellation symbol $x_n$ of the current layer n, an exhaustive search using a maximum likelihood technique for setting values of the constellation symbols $x_i$ and $x_j$.

5. The method for decoding according to claim 1, wherein the method comprises, for constellation symbols $x_i$ at of at least one layer i different from the current layer n, a search in a predetermined region of the constellation symbols $x_i$.

6. The method for decoding according to claim 1, wherein said current layer n is the layer with the highest constellation order.

7. The method for decoding according to claim 1, wherein when said signal comprises a set of data symbols transmitted in one layer, i=j=n=0 and $\alpha_k = \alpha_0 = \|H_0\|^2_{C^{-1}}$, $\beta_{i=n}^R = \Re H_0^H C^{-1} Y$ and $\beta_{i=n}^I = \Im H_0^H C^{-1} Y$.

8. The method for decoding according to claim 1, wherein when said signal comprises a set of data symbols transmitted in two layers, i=j, et i, n∈[0,1]

$\alpha_k = \|H_k\|^2_{C^{-1}}$, $\beta_{i=n}^R = \Re H_i^H C^{-1} Y$, $\beta_n^R = \Re H_n^H C^{-1} Y - \Re H_n^H C^{-1} H_j x_i$, $\beta_{i=n}^I = \Im H_i^H C^{-1} Y$ and $\beta_n^I = \Im H_n^H C^{-1} Y - \Im H_n^H C^{-1} H_j x_i$.

9. The method for decoding according to claim 7, wherein when the terms depending on βk are computed by adding the constant 2.M.βk to each of them, where M is an integer and considering that $\Re H_n^H C^{-1} H_i x_i = \Re H_n^H C^{-1} H_i \Re x_i - \Im H_n^H C^{-1} H_i \Im x_i$ and $\Im H_n^H C^{-1} H_i x_i = \Im H_n^H C^{-1} H_i \Re x_i + \Re H_n^H C^{-1} H_i \Im x_i$, $$\beta_{i \neq n}^R H_i^H C^{-1} Y = M. \Re H_n^H C^{-1} H_i + M. \Im H_n^H C^{-1} H_i$$

and $$\beta_{i \neq n}^I \Im H_i^H C^{-1} Y - M. \Im H_n^H C^{-1} H_i + M. \Re H_n^H C^{-1} H_i.$$

10. The method for decoding according to claim 1, wherein it comprises a subsequent step of decoding, for example a turbo-decoding.

11. The method for decoding according to claim 1, wherein when the noise is a white Gaussian noise, the noise covariance matrix C is equal to $\sigma^2 I$, where I is the identity matrix and $\sigma^2$ is the variance of said white Gaussian noise.

12. The method for decoding according to claim 1, wherein said step of selecting one candidate value for the data symbol of the current layer n implements a hard-symbol slicing.

13. The method for decoding according to claim 1, wherein said method implements a soft-bit decision step.

14. The method for decoding according to claim 8, wherein when said signal comprises a set of data symbols transmitted in N>2 layers, the method comprises S≤N iterations, each iteration processing Q<N layers, while the other (N-Q) layers are included in said covariance matrix C, and delivering transmitted symbols of R≤(Q-1) layers of said Q first layers, called resulting layers, one iteration processing Q layers being different from the resulting layers issued by the previous iterations, Q, R, S being integers able to be different from one iteration to the other.

15. A decoder for decoding a received signal Y corresponding to a data signal transmitted in a MIMO communication system through a channel represented by a channel matrix H, said data signal comprising a set of data symbols x transmitted in at least one layer, each layer carrying at least one data symbol belonging to a signal constellation, wherein said decoder comprises, for one of said at least one layer, called a current layer n:
  means for detecting that determines the maximum likelihood for at least one data symbol of said data signal, wherein said means for detecting comprises:
  means for selecting one candidate value for the data symbol of the current layer n,
  means for determining the Euclidian distance between the received signal Y and the data signal transmitted using said candidate value multiplied by said channel matrix H, weighted by the inverse of a noise covariance matrix C such as $\|Y - \Sigma_i H_i x_i\|_{C^{-1}}^2$, expressed as:

$$\sum_{i \neq n} \|H_i\|_{C^{-1}}^2 |x_i|^2 - 2\Re \left( H_i^H C^{-1} Y - 0.5 \sum_{j \neq i, n} H_i^H C^{-1} H_j x_j \right) x_i^* +$$

$$\|H_n\|_{C^{-1}}^2 |x_n|^2 - 2\Re \left( H_n^H C^{-1} Y - \sum_{j \neq n} H_n^H C^{-1} H_j x_j \right) x_n^* =$$

$$\sum_{i \neq n} \alpha_i^R (\Re x_i)^2 - 2\beta_i^R \Re x_i + \alpha_n^R (\Re x_n)^2 - 2\beta_n^R \Re x_n +$$

$$\sum_{i \neq n} \alpha_i^I (\Im x_i)^2 - 2\beta_i^I \Im x_i + \alpha_n^I (\Im x_n)^2 - 2\beta_n^I \Im x_n$$

wherein:
  $H_k$ is a vector representing the channel associated to a layer k, with k∈{i, j, n}, i, j, n∈[0,N−1], i, j, n being integers, possibly equal and N being the number of layers of said data signal;
  $x_k$ is the constellation symbol of the layer k;

$$\alpha_k^R = \alpha_k^I = \alpha_k = \|H_k\|_{C^{-1}}^2,$$

$$\beta_{i \neq n}^R = \Re H_i^H C^{-1} Y - 0.5 \Sigma_{j \neq i,n} \Re H_i^H C^{-1} H_j x_j,$$

$$\beta_{i \neq n}^I = \Im H_i^H C^{-1} Y - 0.5 \Sigma_{j \neq i,n} \Im H_i^H C^{-1} H_j x_j,$$

$$\beta_n^R = \Re H_n^H C^{-1} Y - \Sigma_{j \neq n} \Re H_n^H C^{-1} H_j x_j,$$

$$\beta_n^I = \Im H_n^H C^{-1} Y - \Sigma_{j \neq n} \Im H_n^H C^{-1} H_j x_j,$$

wherein the terms depending on $\alpha_k$ are computed by adding to each of them a predetermined constant depending on the size of the constellation of the layer k, called a constellation dependent constant.

16. A non-transitory computer-readable medium comprising a computer program product stored thereon and executable by a microprocessor, said computer program product comprising program code instructions for implementing a method for decoding a received signal Y corresponding to a data signal transmitted in a MIMO communication system through a channel represented by a channel matrix H, said data signal comprising a set of data symbols x transmitted in at least one layer, each layer carrying at least one data symbol belonging to a signal constellation, wherein said computer program product comprises:
  program code instructions for processing for one of said at least one layer, called a current layer n, a detection step that determines the maximum likelihood for at least one data symbol of said data signal,
wherein said detection step comprises:
  selecting one candidate value for the data symbol of the current layer n,
  determining the Euclidian distance between the received signal Y and the data signal transmitted using said candidate value multiplied by said channel matrix H, weighted by the inverse of a noise covariance matrix C such as $\|Y - \Sigma_i H_i x_i\|_{C^{-1}}^2$, expressed as:

$$\sum_{i \neq n} \|H_i\|_{C^{-1}}^2 |x_i|^2 - 2\Re \left( H_i^H C^{-1} Y - 0.5 \sum_{j \neq i, n} H_i^H C^{-1} H_j x_j \right) x_i^* +$$

$$\|H_n\|_{C^{-1}}^2 |x_n|^2 - 2\Re \left( H_n^H C^{-1} Y - \sum_{j \neq n} H_n^H C^{-1} H_j x_j \right) x_n^* =$$

$$\sum_{i \neq n} \alpha_i^R (\Re x_i)^2 - 2\beta_i^R \Re x_i + \alpha_n^R (\Re x_n)^2 - 2\beta_n^R \Re x_n +$$

$$\sum_{i \neq n} \alpha_i^I (\Im x_i)^2 - 2\beta_i^I \Im x_i + \alpha_n^I (\Im x_n)^2 - 2\beta_n^I \Im x_n$$

wherein:
  $H_k$ is a vector representing the channel associated to a layer k, with k∈{i, j, n}, i, j, n∈[0,N−1], i, j, n being integers, possibly equal and N being the number of layers of said data signal;
  $x_k$ is the constellation symbol of the layer k;

$$\alpha_k^R = \alpha_k^I = \alpha_k = \|H_k\|_{C^{-1}}^2,$$

$$\beta_{i \neq n}^R = \Re H_i^H C^{-1} Y - 0.5 \Sigma_{j \neq i,n} \Re H_i^H C^{-1} H_j x_j,$$

$$\beta_{i \neq n}^I = \Im H_i^H C^{-1} Y - 0.5 \Sigma_{j \neq i,n} \Im H_i^H C^{-1} H_j x_j,$$

$$\beta_n^R = \Re H_n^H C^{-1} Y - \Sigma_{j \neq n} \Re H_n^H C^{-1} H_j x_j,$$

$$\beta_n^I = \Im H_n^H C^{-1} Y - \Sigma_{j \neq n} \Im H_n^H C^{-1} H_j x_j,$$

wherein the terms depending on $\alpha_k$ are computed by adding to each of them a predetermined constant depending on the size of the constellation of the layer k, called a constellation dependent constant.

17. The method for decoding according to claim 9, wherein when said signal comprises a set of data symbols transmitted in N>2 layers, the method comprises S≤N iterations, each iteration processing Q<N layers, while the other (N-Q) layers are included in said covariance matrix C, and delivering transmitted symbols of R≤(Q−1) layers of said Q first layers, called resulting layers, one iteration processing Q layers being different from the resulting layers issued by the previous iterations, Q, R, S being integers able to be different from one iteration to the other.

\* \* \* \* \*